Feb. 7, 1967   R. K. LOWRY ETAL   3,302,473

BRAKE MECHANISM

Filed May 20, 1964

INVENTORS
ROBERT K. LOWRY
BY and GEORGE P. MATHEWS

*Strauch, Nolan & Neale*

ATTORNEYS

United States Patent Office 3,302,473
Patented Feb. 7, 1967

3,302,473
BRAKE MECHANISM
Robert K. Lowry, North Madison, and George P. Mathews, Ashtabula, Ohio, assignors, by mesne assignments, to Rockwell-Standard Corporation, a corporation of Delaware
Filed May 20, 1964, Ser. No. 368,903
15 Claims. (Cl. 74—110)

The present invention refers to brake mechanism and more in particular to improved actuator structure for automotive brakes.

Automotive brake assemblies of the internally expanding type are known in which the brake shoes are displaced toward the drum by a wedge and roller mechanism, such as for example disclosed in United States Letters Patent No. 3,037,584, and copending application Serial No. 286,038, filed June 6, 1963.

In such brakes the brake shoe ends usually are operatively connected to a pair of coaxial plungers in opposite transverse housing bores, and the actuator is a push rod, wedge and roller assembly adapted to fit within inclined slots or grooves at the inner ends of the plungers so that when the roller and wedge assembly is reciprocated in a direction normal to the direction of the axis of the plungers the plungers will be displaced axially to exert a thrust force on the brake shoes. The present invention assures efficient trouble-free functioning of this type of brake actuator mechanism by providing means whereby the wedge and roller assembly is always correctly positioned in relation to the slots of the plungers, the axis of the rollers is exactly normal and at right angles to the axis of the plungers. This corrects the difficulties encountered in prior structures wherein non-alignment of the parts especially during assembly could cause the mechanism to jam and place excessive stress on the rollers, roller retainer and wedge, resulting in rapid wear and ultimate breakage during actuation in addition to improper and unsafe functioning of the brake mechanism.

Accordingly the major object of the present invention is to provide in a wedge and roller type brake actuating mechanism novel alignment means to assure proper introduction and positioning of the wedge and actuating mechanism in relation to the shoe engaging plungers.

Another object of the present invention resides in the provision of cooperating means within the housing of a wedge type brake actuator mechanism which assures that the motion transmitting rollers carried by the wedge will be positioned in accurate association with the end slots of the brake shoe engaging plungers.

It is a further object of the invention to provide a novel brake actuator structure of the type wherein a wedge reciprocates in a housing bore to oppositely displace a pair of slidable non-rotatable coaxial brake shoe engaged plungers and motion transmitting rollers are mounted on a carrier cage on the wedge for fitting into aligned slots in the plunger ends and wherein the housing has fixed positioning means insuring proper and efficient alignment and association of the rollers and plunger slots. This positioning means preferably comprises parallel surfaces guiding opposite sides of the roller cage, and may be provided in the form of rectangularly apertured plates inserted into the housing bore encompassing the cage. Such plates may be directly non-rotatably interfitted with the bore wall or may be non-rotatably interfitted with split sleeves lining the bore, this latter being preferred for rebuilding prior actuators of the type to include the invention.

Other objects and novel features will become apparent by the following detailed description and claims in connection with the appended drawings in which:

The invention is particularly suitable for incorporation in a brake assembly such as disclosed in United States Letters Patent No. 3,037,584 wherein diametrically opposite wedge actuator units are mounted on the brake spider, and each actuator comprises a wedge assembly for oppositely displacing plungers operably connected to the adjacent ends of brake shoes. Only one such actuator unit is disclosed in the present drawings but it will be understood that the preferred embodiment employs two of them in the type brake assembly shown in said patent.

Figure 1:
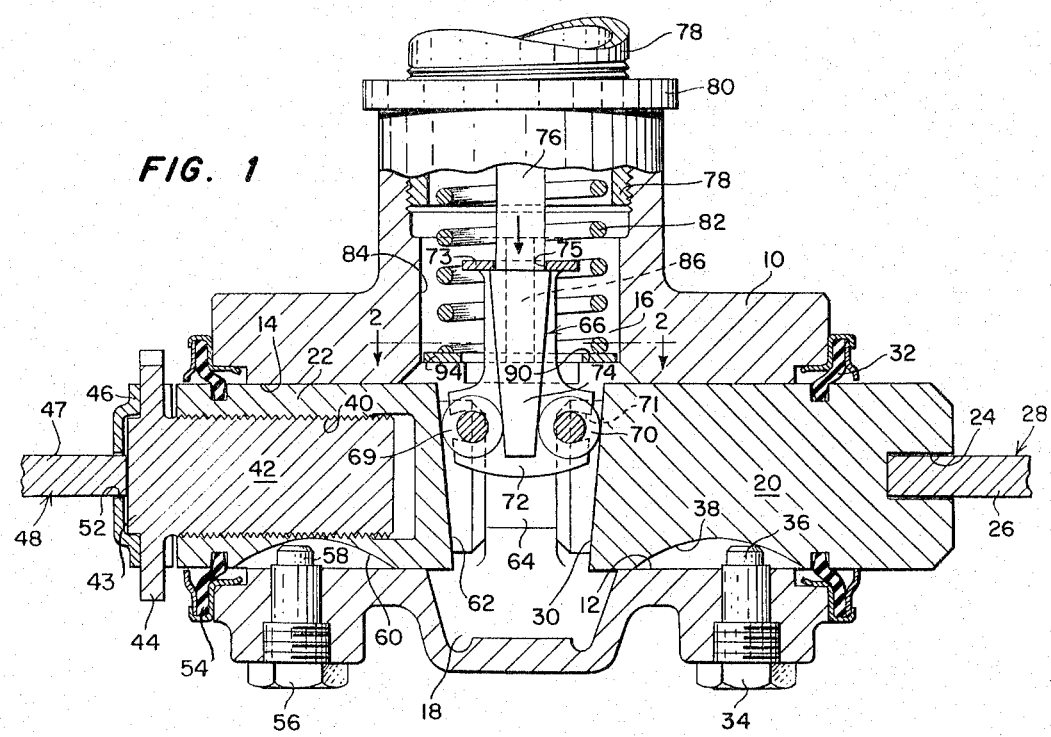
FIGURE 1 is a fragmentary view in cross section through a roller and wedge brake actuating mechanism according to a preferred embodiment of the invention.

Referring now to FIGURE 1, one such actuator unit comprises a housing 10 that is bolted rigidly to or integral with the brake spider (not shown) as in said patent.

Actuator housing 10 is provided with opposite axially aligned through cylindrical bores 12 and 14 of the same size extending in the direction of brake shoe application, and these bores are intersected at the center of the housing by a stepped bore 16 normal to the axes of the bores 12 and 14 and extending inwardly to provide a transverse opening into the interior 18 of housing 10.

Bores 12 and 14 slidably mount a reciprocating plunger 20 and 22, respectively, which normally extend partly into the interior 18 of the housing and partly outwardly of the housing. Both plungers 20 and 22 may be solid or they may be adjustable in length to compensate for brake shoe lining wear or only one way be adjustable and the other may be solid as illustrated in FIGURE 1.

Plunger 20 is solid and provided at the outer end with a slot 24 adapted to receive the end of a web 26 of a brake shoe 28. The inner end of plunger 20 is provided with an inclined slot 30 transverse to the axis of the plunger for a purpose to appear. A suitable flexible seal 32 between plunger 20 and housing 10 at the outer end thereof prevents entry of foreign matter into the housing through plunger bore 12. In addition, plunger 20 is prevented from rotating within bore 12 as by a capscrew 34 mounted in the housing 10 having a dog type end 36 extending into an axial slot 38 in the plunger.

The other plunger 22 is centrally provided with a threaded axial recess 40 which rotatably mounts a threaded stud 42. The plunger 22 and stud 42 are relatively axially movable when stud 42 is rotated. The stud 42 is provided outwardly of the housing with a toothed starwheel 44 by which the stud may be rotated to thus vary the effective overall length of the plunger and stud assembly to compensate for brake shoe lining wear. Stud 42 is normally held against undesired rotation as by a resilient clip means 46 attached around the starwheel 44. Clip 46 provides a means to secure the web 47 of a brake shoe 48 against the end of stud 42 by having the brake shoe web extend through a slot 52 in the front face of the clip into abutment with a raised end portion 43 on the stud at the center of starwheel 44.

Clip 46 and associated structure are preferably the same as that disclosed and claimed in co-pending application Serial No. 343,696, filed February 10, 1964, and for a more detailed description thereof reference may be made thereto. Also said adjustment of plunger 22 may be made automatic as disclosed in said co-pending application and in United States Patent No. 3,068,964 to which reference is made for any further necessary detail.

A suitable flexible seal 54 between plunger 22 and housing 10 prevents the entry of foreign matter into the housing through bore 14 and the escape of lubricant from the housing.

A capscrew 56, similar to capscrew 34, has a dog type end 58 extending into an axial slot 60 of plunger 22 to prevent the plunger from rotation within bore 14.

Inwardly of housing 10 plunger 22 is slotted at its end at 62, slot 62 being inclined at the same angle as the slot 30 of plunger 20 but in the opposite direction so that slots 30 and 62 converge toward space 18 in the assembly.

The ends of plungers 20 and 22 normally abut within the housing against opposite sides of a raised boss portion 64, which provides an anchoring means for either plunger when the brake is actuated.

The inclined inner slots 30 and 62 of plungers 20 and 22 are adapted to receive a reciprocating wedge and roller mechanism 66 that comprises opposite rollers 68 and 70 positioned within slots 30 and 62. Rollers 68 and 70 are rotatively supported in a cage type carrier 72 that is supported on and surrounds a wedge thrust member 74 extending through the transverse bore 16 of the housing 10 and between the rollers 68 and 70. The opposite sides of the wedge member 74 are equally inclined to converge at an angle corresponding to the convergences of respective inclined surfaces of the slots 30 and 62.

Wedge thrust member 74 is formed at the end of a push rod 76 extending through a tubular adapter 78 adjustably screwed into the open end of housing bore 16 and secured in adjusted position thereto by a locknut 80. The tubular adapter 78 may support a fluid motor (not shown) for effecting selective reciprocation of rod 76, rod 76 being suitably connected to the piston or diaphragm of the motor.

A coil spring 82 surrounding the push rod 70 acts to hold the push rod and wedge in the retracted position of FIGURE 1 when the brake mechanism is inactivated. Prior to the invention this spring seated at its inner end on an internal outwardly facing annular shoulder 90 in bore 16.

The foregoing reciprocable wedge and roller assembly including the association thereof with the slotted inner ends of the plungers may preferably be the same as disclosed in said Patent No. 3,037,584 to which reference is made for any further details as to structure and operation. When rod 76 is displaced in the direction of the arrow in FIGURE 1 due to energization of the motor on adapter 78, the wedge and roller assembly cause simultaneous outward displacement of plungers 20 and 22 to urge the brake shoes into frictional contact with the usual surrounding drum. As the wedge 74 moves toward space 18 the freely rotatable rollers 68 and 70 shift outwardly in cage slots 69 and 71 respectively, whereby a substantially frictionless rolling contact force transmission is provided between the wedge and the plungers during brake application. The usual brake return springs between the shoes return the plungers to FIGURE 1 position when the brake control pedal is released.

In order for the foregoing brake actuating mechanism to function with optimum efficiency it is of great importance that the plungers 20 and 22 be exactly aligned axially and that the wedge and roller assembly 66 is disposed within the inclined plunger slots 30 and 62 in correct position in relation to the axis of the plungers and are retained in this position during operation so that upon wedge reciprocation the rollers 68 and 70 will not bind or scrape the edges of the plunger slots. During assembly, difficulties have been encountered in the correct insertion of the wedge assembly with relation to the slots and it has been found in service that even a minor misalignment from the correct position may result in faulty operation of the brake actuating mechanism.

The present invention is particularly intended to remedy this difficulty.

The cage 72, as disclosed in said Patent No. 3,037,584, is a U-shaped integral spring steel element having a bridge 73 formed with an aperture 75 loosely receiving the rod 76 at the back of the wedge 74. Cage 72 comprises substantially parallel side arms 77 in which are formed the roller mounting slots 69 and 71.

Figure 2:
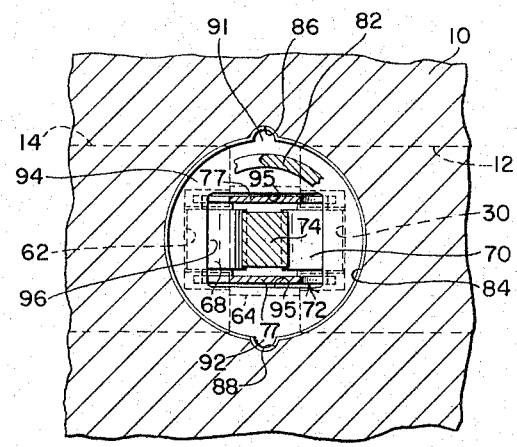
FIGURE 2 is a transverse section through the wedge housing along line 2—2 of FIGURE 1.

As shown in FIGURE 2 the outer bore section 84 is provided with diametrically opposite axial grooves 86 and 88 which are adapted to receive projections or tangs 91 and 92 radially extending from the edge of a guide washer plate 94 seated on shoulder 90. Washer 94 is of slightly less diameter than the bore section 84 to be easily inserted therein, but it can be located in only one position as determined by the cooperating grooves 86 and 88 and tangs 91 and 92 which also prevents rotation of the washer 94 after being placed in the bore section 84. Spring 82 bears on washer 94 to hold it seated.

Washer 94 has a centrally located rectangular aperture 96 which is slightly wider than the roller cage 72 on which the washer 94 is preferably supported prior to assembly. The tang and slot structure definitely orients the washer 94 so that the long sides 95 of rectangular aperture 96 are in closely adjacent substantially slidable association with cage arms 77 in the assembly to guide the cage during assembly and restrain the cage against lateral displacement during normal brake operation. During insertion of the wedge and roller assembly, which has the washer 94 mounted on it, into the bore section 84, the entire assembly must be circumferentially oriented until the tangs 91 and 92 slide into grooves 86 and 88. This automatically aligns the wedge and roller assembly in proper relation to the slots 30 and 62 so that rollers 68 and 70 cleanly enter into the slots in proper location and rolling alignment. Due to the rectangular shape of the aperture 96 in washer 94, the wedge and roller assembly can not turn relative thereto about the rod axis. Upon full insertion of the wedge and roller assembly within slots 30 and 62, washer 94 comes to rest upon shoulder 90.

Although confined against rotation, the wedge and roller assembly is free to reciprocate through the relatively fixed rectangular aperture 96 of washer 94 and the rollers are always guided and held in correct positive alignment in relation to the plunger slots 30 and 62 by reason of the confinement provided by the rectangular shape of the aperture. Moreover, the wedge and roller assembly is free for limited movement in the direction of the axis of the plungers, that is parallel to sides 95 in the direction of brake shoe application, as permitted by the length of rectangular aperture 96 to allow the wedge and roller assembly to follow the non-anchoring plunger upon brake actuation, as will be understood by persons skilled in the art.

Figure 3:
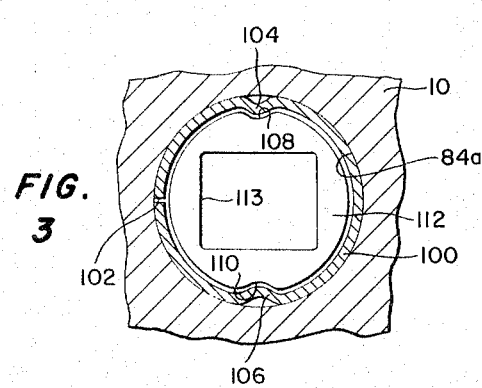
FIGURE 3 is a fragmentary view in section illustrating a further embodiment of the invention.
Figure 4:
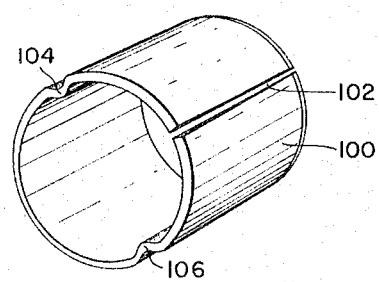
FIGURE 4 is a perspective illustration of the locating sleeve of the embodiment of FIGURE 3.

FIGURES 3 and 4 illustrate a further embodiment which may be conveniently provided for conversion of existing brake actuating mechanism of the type of said Patent No. 3,037,584 in the field which have not been provided with anchored guiding and locating washer arrangement described in FIGURES 1 and 2.

Here, a split adapter sleeve 100 is inserted into the smooth bore section 84a which is approximately the same length as the bore section and, when completely inserted, abuts at its inner end against shoulder 90 of FIGURE 1. To facilitate insertion of sleeve 100 and to provide a final tight fit within bore section 84a the sleeve is axially split as at 102 so that it may be contracted in diameter and then permitted to, upon insertion, expand tightly within bore section 842.

The interior of the sleeve 100 is provided with opposed longitudinal ridges 104 and 106 axially extending the entire length of the sleeve. Ridges 104 and 106 fit into matching notches 108 and 110 in the radial edge of a washer 112 adapted to be inserted into sleeve 100. Washer 112 is of slightly less diameter than the sleeve to assure easy insertion and is held against rotation relative to sleeve 100 by coaction of notches 108 and 110 with ridges 104 and 106.

The washer 112 in FIGURE 3 is essentially the equivalent in function of the washer 94 in FIGURES 1 and 2 and is therefore likewise provided with a central rectangular aperture 113 permitting the washer to be placed on the roller cage 72 with opposite sides of aperture 113 slidingly associated with side arms 72 as in FIGURE 2.

In this embodiment the sleeve 100 is first introduced to line bore section 84a which is cylindrical and not preformed with the machined grooves 86 and 88 of FIGURE 2, and then the wedge and roller assembly is inserted through the sleeve with the washer 112 mounted on the roller cage 72 and positioned such that notches 108 and 110 fit around the ridges 104 and 106.

Otherwise assembly and operation of this embodiment is the same as in FIGURES 1 and 2, with aperture 113 coacting with the cage 72 in the same manner as shown in FIGURE 2.

The present invention therefore provides a foolproof definite wedge and roller assembly alignment means in relation to the plunger slots.

The roller cage, the rectangular aperture in the washer and the groove and projection interlock of the washer with the bore wall or liner provide a single definite relationship between the wedge and the plunger slots and a guiding means during assembly.

The present invention may be embodied in other forms without departing from the essential characteristic and spirit thereof, therefore, the present embodiment is to be considered in all respects as illustrative only and not restrictive, the scope of the invention being indicated by the appended claims rather than by the foregoing description.

What is claimed and desired to be secured by United States Patent is:

1. In a wedge type brake actuator, a housing having a bore and having grooved inner ends facing each other within said housing, opposed coaxial brake shoe connected plungers slidable in said housing, a push rod in said housing extending through said bore reciprocable normal to said plunger axes and having a fixed wedge on one end, a roller carrier mounted on said push rod, rollers mounted on said carrier in rolling contact with opposite sides of said wedge and with the grooved adjacent ends of said plungers, positioning means in said housing having means adjacent opposite sides of said carrier for orienting said roller carrier and guiding said rollers into predetermined operative relation within said grooved plunger ends during assembly and maintaining said relation during normal brake operation, and cooperating means on said positioning means and in said bore for positively fixing said positioning means against rotation about the axis of said bore.

2. In the brake actuator defined in claim 1, said carrier having parallel side members rotatably mounting said rollers on axes normal to the push rod axis and said positioning means comprising means defining substantially fixed parallel surfaces slidably associated with said carrier side members.

3. In the brake actuator defined in claim 1, said positioning means comprising a member disposed within said bore and non-rotatably mounted therein, said member being apertured to substantially slidably pass opposite sides of said carrier.

4. In a brake assembly, a housing having opposed bores, coaxial plungers non-rotatably and slidably mounted in said bores and provided at their outer ends with means for operative connection to brake shoes, opposed grooves in the inner ends of said plungers, an actuating wedge assembly comprising a wedge mounted for reciprocation in a direction at right angles to the direction of movement of said plungers, a cage loosely mounted on said wedge assembly mounting opposed rollers which at opposite sides engage in rolling contact with said wedge sides and within one of said grooves, positioning means within said housing cooperating with said cage for orienting said wedge assembly and guiding and maintaining said rollers in alignment with said grooves during assembly and normal brake operation, and cooperating means on said positioning means and within said housing positively fixing said positioning means against rotation about the axis of said wedge assembly.

5. In the brake assembly defined in claim 4, a third bore within said housing intersecting the inner ends of said plunger bores, and said positioning means comprising a non-rotatably mounted apertured plate in said bore surrounding said cage.

6. In the brake assembly defined in claim 5, said cage having parallel side members in which said rollers are journaled on axes perpendicular to the axis of reciprocation of said wedge, and said plate aperture having parallel side surfaces closely adjacent said members.

7. In the brake assembly defined in claim 6, said cage being loosely mounted on said wedge, and the aperture in said plate being sufficiently long in the direction of said side surfaces to permit floating displacement of said cage on the web while preventing substantial displacement of said cage in a direction normal to said surfaces.

8. In a brake actuator, a housing having aligned transverse bores slidably mounting brake shoe operating plungers and a third bore within which a wedge is reciprocable, a carrier on said wedge mounting rollers in rolling contact at opposite sides with said wedge and recesses in the adjacent plunger ends, a rectangularly apertured plate non-rotatably mounted in said third bore with opposed sides in adjacent slide guide relation to opposite sides of said carrier, and cooperating longitudinally extending radial projection and groove means on said plate and bore for slidable non-rotatable insertion of the plate in said third bore and a predetermined location relative to the axis of said third bore for orienting and guiding movement of said carrier in said apertured plate.

9. For use in a break actuator having a housing bore within which reciprocates a wedge mounting a carrier supporting roller for rolling contact with opposite sides of the wedge and the adjacent grooved ends of axially aligned reciprocable brake shoe operating plungers, a split sleeve for lining said bore and a rectangularly apertured plate non-rotatably mounted within said sleeve surrounding said carrier, said plate and sleeve having cooperating longitudinal rib and groove means for effecting said non-rotatable mounting and orienting opposite sides of said aperture in such guiding relation to said carrier to insure alignment of said rollers with said plunger end grooves.

10. In a wedge brake actuator, a housing having a bore, opposed coaxial brake shoe connected plungers slidable in said housing and having grooved inner ends facing each other within said housing, a push rod extending through said housing bore reciprocable normal to said plunger axes and having a fixed wedge on one end, a roller carrier mounted on said push rod, rollers mounted on said carrier in rolling contact with opposite sides of said wedge and with the grooved adjacent end of said plungers, and positioning means in said housing having means adjacent opposite sides of said carrier for guiding said rollers into predetermined operative relation within said grooved plunger ends during assembly and maintaining said relation during normal brake operation, said positioning means comprising a sleeve tightly lining said bore and an apertured plate non-rotatably disposed within said sleeve and said plate being so apertured as to substantially slidably pass opposite sides of said carrier, said sleeve being longitudinally split whereby it may be contracted during insertion into the bore and allowed to expand into tight frictional engagement with the bore wall.

11. In a wedge type brake actuator, a housing having a bore, opposed coaxial brake shoe connected plungers slidable in said housing and having grooved inner ends facing each other within the housing, a push rod extending through said housing bore reciprocable normal to said plunger axes and having a fixed wedge on one end, a roller carrier mounted on said push rod, rollers mounted on said carrier in rolling contact with opposite sides of said wedge and with the grooved adjacent ends of said plungers, and positioning means in said housing having means adjacent opposite sides of said carrier for guiding said rollers into predetermined operative relation within said grooved plunger ends during assembly and maintaining said relation during normal brake operation, said positioning means comprising a member disposed within said bore, said bore and said member having means defining circumferentially spaced pairs of interfitting longitudinal rib and groove means for non-rotatably mounting said member in the bore, and said member being apertured to substantially slidably pass opposite sides of said carrier.

12. In a brake actuator, a housing having aligned transverse bores slidably mounting brake shoe operating plungers and a third longitudinally grooved bore within which a wedge is reciprocable, a carrier on said wedge mounting rollers in rolling contact at opposite sides with said wedge and recesses in the adjacent plunger ends, and a rectangularly apertured plate non-rotatably mounted in said bore with opposed aperture sides in adjacent slide guide relation to opposite sides of said carrier, said plate having peripheral projections fitting into said third bore grooves for non-rotatably positioning said plate in the bore.

13. For use in a brake actuator of the type having an actuator housing formed with opposed bores wherein coaxial brake shoe operating plungers are slidably mounted and wherein a third bore is provided which extends to the intersection of said coaxial bores, an actuating wedge assembly adapted to be inserted into said third bore comprising a wedge mounted on a rod for reciprocation in a direction at right angles to the direction of movement of said plungers, a cage carried by said wedge assembly mounting opposed rollers which engage in rolling contact with opposite sides of said wedge and the inner ends of said plungers, a compression spring coaxial with the rod, and a guide plate surrounding the wedge assembly in slide guide cooperation with said cage for establishing and maintaining said rollers in operative relation with said plunger inner ends during assembly and normal brake operation, said guide plate being carried by said wedge assembly and serving as an abutment for the adjacent end of said spring, and means on said guide plate formed for non-rotatably fitting with means within said third bore for determining the rotated position of the inserted wedge assembly in the bore and non-rotatably maintaining that position.

14. In a wedge type brake actuator, a housing having a bore, opposed coaxial brake shoe connected plungers slidable in said housing and having grooved inner ends facing each other within said housing, a push rod in said housing extending through said bore reciprocable normal to said plunger axes and having a fixed wedge on one end, a roller carrier mounted on said push rod, rollers mounted on said carrier in rolling contact with opposite sides of said wedge and with the grooved adjacent ends of said plungers, and positioning means non-rotatably mounted in said housing having means adjacent opposite sides of said carrier for orienting said roller carrier and guiding said rollers into predetermined operative relation within said grooved plunger ends during assembly and maintaining said relation during normal brake operation, said positioning means comprising a plate disposed within said bore non-rotatably connected directly to the wall of said bore apertured to substantially slidably pass opposite sides of said carrier.

15. In a wedge type brake actuator, a housing having a bore, opposed coaxial brake shoe connected plungers slidable in said housing and having grooved inner ends facing each other within said housing, a push rod in said housing extending through said bore reciprocable normal to said plunger axes and having a fixed wedge on one end, a roller carrier mounted on said push rod, rollers mounted on said carrier in rolling contact with opposite sides of said wedge and with the grooved adjacent ends of said plungers, and positioning means non-rotatably mounted in said housing having means adjacent opposite sides of said carrier orienting said roller carrier and for guiding said rollers into predetermined operative relation within said grooved plunger ends during assembly and maintaining said relation during normal brake operation, said positioning means comprising a sleeve tightly lining said bore and a plate non-rotatably connected to said sleeve, said plate being apertured to substantially pass opposite sides of said carrier.

References Cited by the Examiner

UNITED STATES PATENTS

| | | | |
|---|---|---|---|
| 3,037,584 | 6/1962 | Cox et al. | 188—78 |
| 3,113,466 | 12/1963 | Osborne | 74—110 |
| 3,139,762 | 7/1964 | Alfieri | 74—110 |

FRED C. MATTERN, JR., *Primary Examiner.*

MILTON KAUFMAN, *Examiner.*

F. E. BAKER, *Assistant Examiner.*